Dec. 3, 1929.  F. B. PFEIFFER ET AL  1,738,018
TIRE BEAD BUILDING MACHINE
Filed Nov. 22, 1926  3 Sheets-Sheet 1
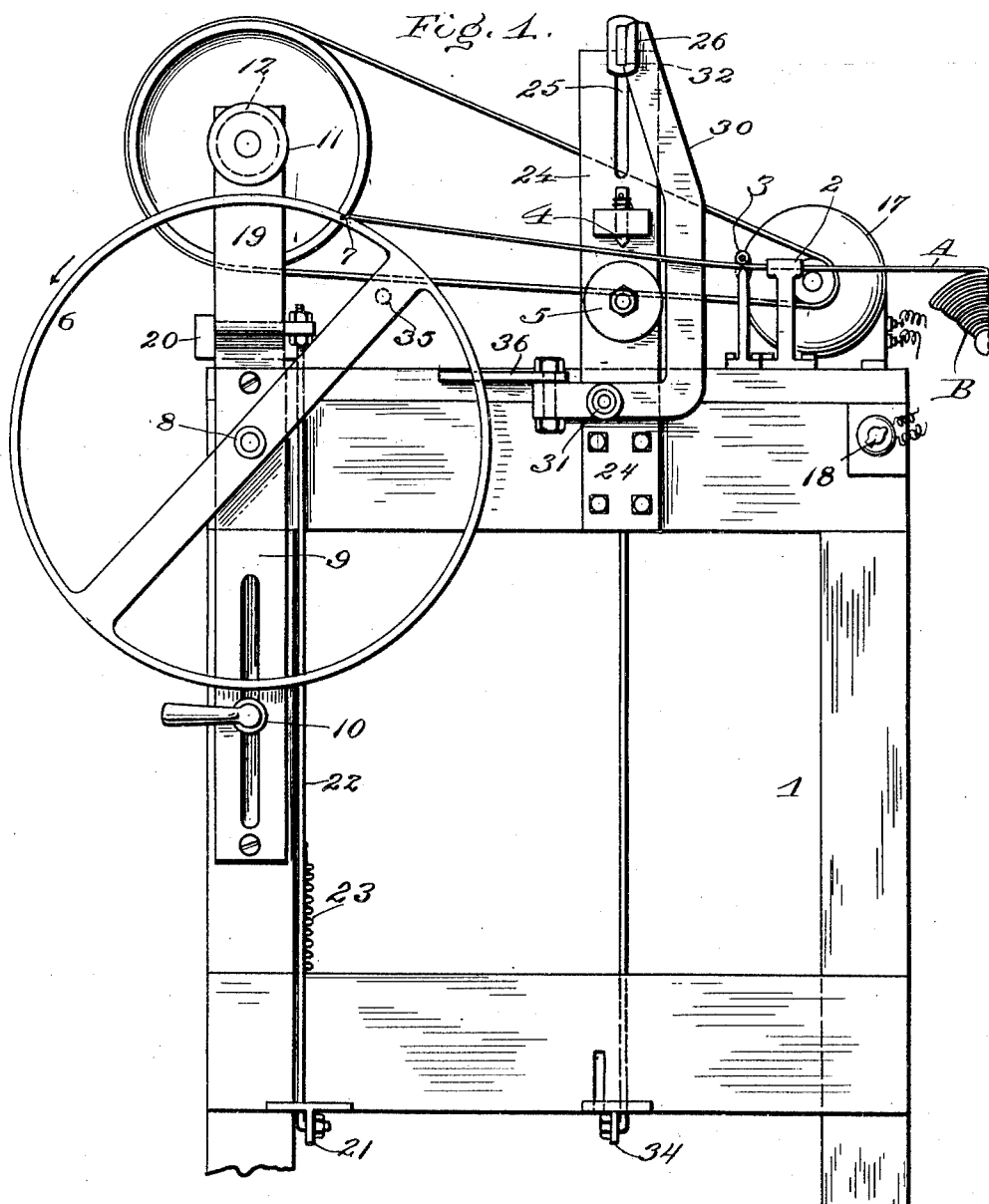
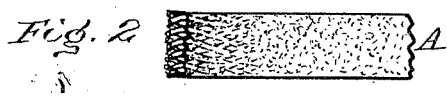
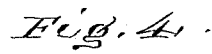
INVENTORS
Fred B. Pfeiffer
BY John W. White
Rogers, Kennedy & Campbell ATTORNEYS

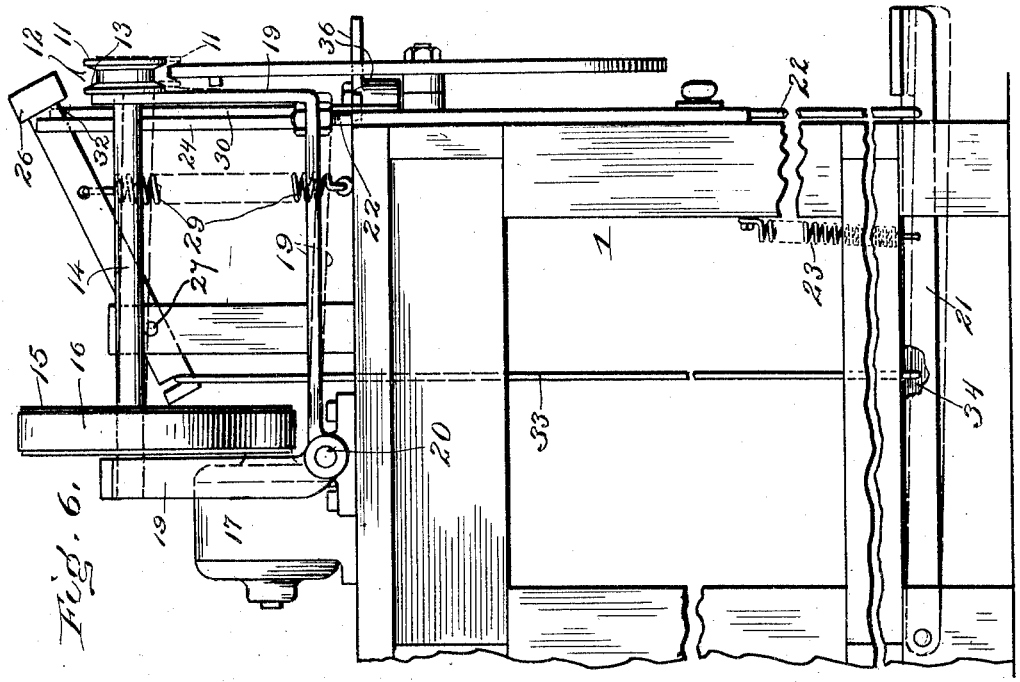

Dec. 3, 1929.   F. B. PFEIFFER ET AL   1,738,018
TIRE BEAD BUILDING MACHINE
Filed Nov. 22, 1926   3 Sheets-Sheet 3
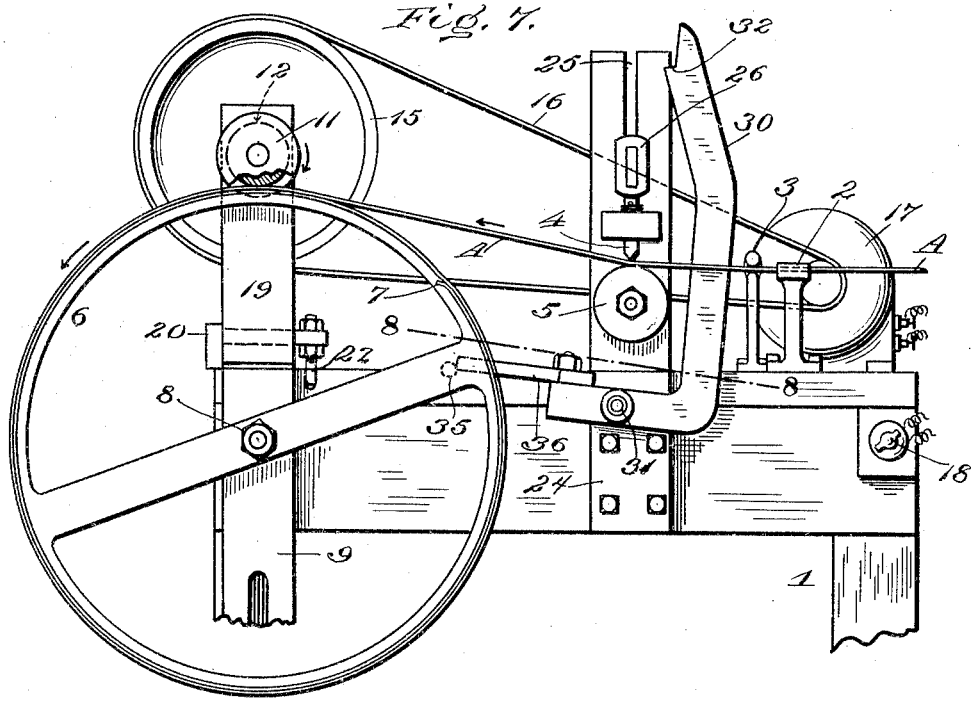
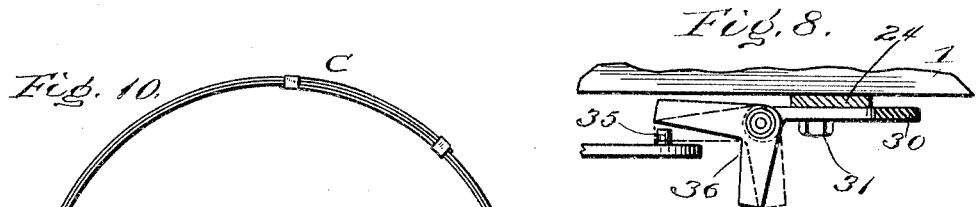
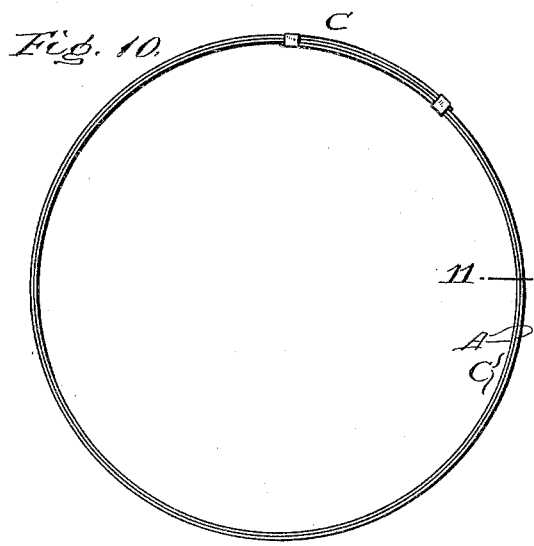
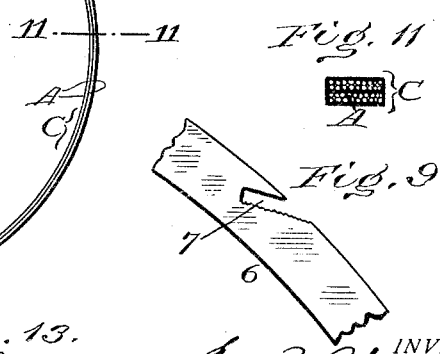
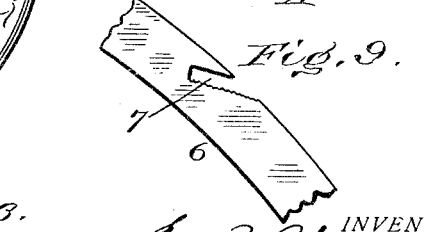
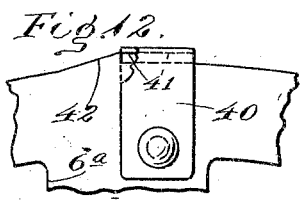
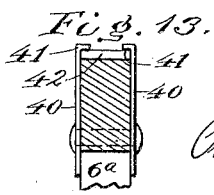

Patented Dec. 3, 1929

1,738,018

UNITED STATES PATENT OFFICE

FRED BROWN PFEIFFER, OF AKRON, AND JOHN WILLIAM WHITE, OF BARBERTON, OHIO, ASSIGNORS TO SEIBERLING RUBBER COMPANY, A CORPORATION OF DELAWARE

TIRE-BEAD BUILDING MACHINE

Application filed November 22, 1926. Serial No. 149,823.

This invention is directed to an improved machine for building beads or bead rings, such for instance as are used in the manufacture of pneumatic tire casings of the straight-side variety, and is particularly adapted for the building of beads composed of braided wire. As is well known in the art, for beads of this kind the braided wire is usually made up in the form of a flat strip or tape and is passed through a tubing machine, which completely encases the wire in unvulcanized rubber, after which the rubber tape is wound spirally into ring form for incorporation in the tire. Heretofore, the latter operation has been performed largely by hand, the operator taking the rubberized tape as it leaves the tubing machine and winding it around a mandrel or former upon a so-called flipper strip, which is later wrapped or folded over the ring to complete the operation. The present invention does away with the old hand operations and provides a machine which will build the bead rings much more expeditiously and with far greater uniformity than they can be built by hand. The machine as herein illustrated is limited to the building of bead rings alone, it being the intention to employ a separate machine for applying the flipper strips to the bead rings after they have been made up in the present machine. It would be perfectly feasible, however, to modify the parts so that the bead ring could be formed upon the flipper strip according to the old practice, but it is preferred to attach the flipper strip as a separate operation. The machine is of extremely simple construction, comprising but few parts which may be easily and quickly operated. In operation, the rubberized braided wire tape is fed into the machine, past a cutting tool, and the leading end inserted in a diagonal slot or notch cut in the periphery of a rotatable ring or former, which is preferably of the same width as that of the wire tape and which is of a diameter appropriate for the size of ring to be produced. After the tape has thus been attached to the rotatable ring, the latter is rotated by a power driven grooved pressure roller until two or more turns of the tape have been wound upon the ring, the roller acting, during the rotation of the ring, to press the spiral convolutions together into intimate contact and to cause them to cohere, due to their rubberized nature. Just before the winding operation is completed, the cutting tool is operated to sever the wire tape at a point which will bring the final end portion of the bead in overlapping relation to the leading end portion first attached, this final end portion, of course, being cemented in place by the continued rotation of the forming ring by the pressure roller. The bead or bead ring having now been completed, is removed from the forming ring and its two end portions, if need be, wrapped with rubberized fabric to hold them in place. For the next operation, the leading end of the braided wire tape is again anchored to the forming ring by its insertion in the slot or notch formed therein and the operation repeated. This, in general, is the preferred mode of operation of the machine, although it will be obvious that the number of turns of the tape upon the forming ring, or the point of severance of the tape, may be variously modified to suit the requirements or conditions. One of the characteristic features of the machine is that the rubberized tape is wound into ring form without tension, which feature is important in avoiding shrinkage of the bead ring after formation, and in allowing the meshes of the braided wire to be filled with rubber during vulcanization, for the proper insulation of the individual wires. The exact construction and operation of the various parts will best be understood from the detailed description to follow.

Referring to the drawings:

Fig. 1 is a front elevation of the improved machine;

Figs. 2, 3 and 4 are plan, edge and cross-sectional views, respectively, of the braided wire tape which the machine is particularly designed to handle;

Fig. 5 is an end view of the machine, looking from the right in Fig. 1;

Fig. 6 is a similar view looking from the left in Fig. 1;

Fig. 7 is a front elevation, like Fig. 1, showing the parts in operation and the cutting tool in the act of severing the wire tape;

Fig. 8 is a transverse section taken on the line 8—8 of Fig. 7, showing the trip for the power hammer;

Fig. 9 is an enlarged side elevation of a segment of the rotatable ring or former and showing, in part, the cut or incision made therein;

Fig. 10 is an elevation of a form of bead ring produced by the machine;

Fig. 11 is a transverse section taken on the line 11—11 of Fig. 10;

Fig. 12 is a fragmentary view, in side elevation, of the modified form of ring or former; and Fig. 13 is a section taken on the line 13—13 of Fig. 12.

The various operative parts are all mounted upon a supporting frame 1, which may be of any suitable form or construction and made of wood or metal, as desired.

Figs. 2, 3 and 4 illustrate in detail a braided wire tape A, which is used in building the bead rings, this tape as shown being encased in rubber, as ordinarily. The tape is fed into the machine from a spool or roll B (Fig. 1) or, if desired, it may be taken directly from the tubing machine as it is rubberized, or from any other suitable source of supply.

As shown in Fig. 1, the rubberized tape A passes through guides 2 and 3, located at the top of the supporting frame, and is carried between an overlying vertically acting cutting tool 4, of the impact variety, and an underlying rotatable roller or anvil 5 on its way to a rotatable forming ring or mandrel 6 around which the tape is wound spirally into ring form. The forming ring 6 is of the same width as the wire tape and is formed in its outer periphery with a diagonal cut or notch 7 (Fig. 9), which is adapted to receive the leading end of the tape and afford a convenient means of anchorage. If desired, one or both of the walls of the notch 7 may be roughened or toothed to enable them to grip the wire tape more securely and hold it in place during the rotation of the forming ring. This forming ring 6, in the present instance, is journaled at 8 in a vertically adjustable slide 9 mounted in suitable guideways formed in the front of the supporting frame, and held in its adjusted position by suitable clamping devices 10. By reason of such adjustment, the machine may be equipped with forming rings of different diameters for building bead rings of different sizes. As will be noted, the forming ring 6 is freely rotatable on its axis 8, so that it may be turned in either direction by the operator in first starting the bead building operation, or in making repairs, or otherwise manipulating the bead during or after building.

Once the leading end of the wire tape is attached to the forming ring 6, the latter is rotated counter-clockwise or in the direction of the arrow in Fig. 1, until such leading end is positioned below or slightly beyond a power driven roller 11 located in line with the vertical diameter of the forming ring and which is then moved down into contact with the tape to exert sufficient pressure thereon to rotate the forming ring until the desired number of turns of the tape have been wound upon the ring. As best shown in Figs. 5 and 6, the pressure roller 11 is formed in its outer periphery with an annular groove, the bottom 12 of which is of substantially the same width as the forming ring 6 or the wire tape, and the sides 13 of which are preferably beveled or flared outwardly. The beveled side walls 13 thus act to guide and center the wire tape properly upon the forming ring while the plain cylindrical bottom 12 acts to roll the tape smoothly and uniformly upon the outer periphery of the ring or upon the successive convolutions of the tape as they are formed on the ring, as well as to press the convolutions into close adhesive contact with each other. At this point, it may be noted that the spool or roll B is loosely mounted so that no tension is exerted on the tape as it is drawn from the spool by the driving engagement between the pressure roller 11 and the forming ring 6.

In the present embodiment, the pressure roller 11 is mounted upon the forward end of a drive shaft 14 provided at its opposite or rear end with a pulley 15 connected by a belt 16 to an electric motor 17 controlled by a start and stop button 18. The motor 17 is mounted stationarily upon the top of the supporting frame 1, whereas the drive shaft 14 with its attached pulley and pressure roller is journaled in a rectangular frame 19, pivoted at its lower end to the top of the supporting frame, as at 20, in such manner that the pressure roller may be swung downwardly into driving engagement with the forming ring or upwardly out of driving engagement therewith. Such movements of the pressure roller are controlled and effected by means of a foot treadle 21 arranged at the front of the machine within convenient reach of the operator, and connected by means of a rod 22 to the swinging frame 19 at the front (see Figs. 1 and 6). A spring 23, pulling upwardly on the foot treadle from a fixed part of the supporting frame, serves normally to hold the pressure roller in its upper or inoperative position. In this way, the pressure roller, which, of course, is continuously driven by the electric motor 17, may be brought into or out of operation simply by depressing or releasing the foot treadle. Since the pressure roller is moved into engagement with the work by the depression of the foot treadle, the operator may readily vary the pressure upon the work at his pleasure, and also allow the roller to yield as the bead ring is progressively built up.

Turning back to the impact cutting tool 4 and the associated roller anvil 5, these are mounted upon a suitable supporting plate or post 24 attached to the supporting frame at the front. At its upper end, the post 24 is formed with a vertical guide slot 25 to receive the shank of a small power hammer 26 adapted, when released, to strike the cutting tool 4 and cause it to sever the passing wire tape. The power hammer 26 is pivoted at the rear, as at 27, to a post or standard 28 rising from the supporting frame, and is constantly urged downward by a strong tension spring 29 attached to it near the front and pulling thereon from a fixed supporting frame. Normally, the hammer is held up against the tension of the spring 29 by a trip lever 30, pivoted at its lower end, as at 31, to the supporting plate 24 below the roller anvil 5, and formed at its upper end with a notch 32 to engage and hold the shank of the hammer (see Figs. 1, 5 and 6). Consequently, to release the hammer, it is merely necessary to swing the trip lever 30 to the right in the manner indicated in Fig. 7, whereupon, the tension spring 29 acts instantly to snap it into engagement with the cutting tool 4, the impact being amply sufficient to sever the traveling tape. As a convenient means of restoring the hammer to its normal inoperative position, it is attached at its rear end, beyond the pivot 27, to a rod 33 which connects it to a foot treadle 34 pivoted to the supporting frame and arranged alongside of the foot treadle 21 within convenient reach of the operator.

While the tripping of the power hammer might be controlled manually, it is herein shown as brought under the control of the forming ring 6, so that the latter will effect the severance of the wire tape at a point which will bring the final end portion of the last turn in overlapping relation to the leading end portion of the first turn, such as shown in Fig. 10. This may be accomplished by providing the ring 6, at the proper point, with a laterally projecting pin 35, and the trip lever 30, at its lower end, with a small pivoted bell crank handle 36, the latter serving as an interponent for making or breaking operation connection between the forming ring and the trip lever. Thus, as shown in Fig. 8, when the handle 36 occupies the position indicated by the full lines, it stands clear of the pin 35 and hence allows the forming ring to rotate without affecting the trip lever, this being necessary during the early stages of operation. However, when the last portion of the bead ring is being wound upon the forming ring, the operator moves the handle 36 into the position indicated by the dotted lines in Fig. 8, where it stands in the path of the pin 35, which therefore, in the rotation of the forming ring, rocks the trip lever to the right to release the hammer.

The completed bead ring C is shown in Fig. 10, this form presenting but two turns or convolutions. Other forms of ring might require three or four or more turns, depending upon the size of the tire for which they are designed. The diameters of the bead rings will also vary according to the size of tire, this matter being readily provided for, as before stated, by employing forming rings of corresponding diameter.

The operation of the machine has been described, along with the description of the details, and hence no further description is believed to be necessary.

Figs. 12 and 13 illustrate a modified form of forming ring 6ª intended to provide for the attachment of the leading end of the wire tape without binding. In this form, the ring is provided with a pair of plates 40 attached thereto at opposite sides and provided at their upper ends with inwardly extending lips 41 overhanging the periphery of the ring and forming in connection with the latter a slot to receive the end of the wire tape. As preferred, the ring is also formed with a shoulder 42 located at the further end of the slot and serving as a stop against which the end of the wire tape will abut when inserted therein.

The invention has been shown and described herein merely in preferred form and by way of example, and it will be obvious that many changes and modifications may be made in the various parts without departing from the spirit of the invention. It will be understood, therefore, that the invention is not limited to any specific form or embodiment, except in so far as such limitations are specified in the appended claims.

Having thus described our invention, its construction and mode of operation, what we claim and desire to secure by Letters Patent of the United States, is as follows:

1. In a machine for building tire beads from rubberized wire tape, the combination of a rotatable ring upon which the beads are wound, said ring presenting only a cylindrical surface of the same width as the wire tape, and a pressure roller arranged to cooperate with the ring in winding the tape thereon without tension, said roller being grooved on its outer periphery to straddle the ring and to guide and center the tape upon the ring in the winding operation.

2. In a machine for building tire beads from rubberized wire tape, the combination of a freely rotatable ring upon which the beads are wound, said ring having a smooth cylindrical surface of the same width as the wire tape, a pressure roller having a grooved outer periphery adapted to engage and center the tape upon the ring as it is rotated, and means for driving the roller and thru it to rotate the ring whereby to lay the tape smoothly and accurately upon the periphery of the ring without tension.

3. In a machine for building tire beads from rubberized wire tape, the combination of a freely rotatable ring upon which the beads are wound, said ring having a smooth cylindrical surface of the same width as the wire tape, an adjustable support for said ring whereby its axis of rotation may be selectively shifted, a power driven pressure roller movable into and out of frictional engagement with the periphery of the ring or wire tape thereon, said roller having a grooved outer periphery for straddling the ring and guiding and centering the tape upon the face of the ring, and releasable means for holding the pressure roller in driving engagement with the ring to rotate the ring and wind the wire tape thereon.

4. In a machine for building tire beads from rubberized wire tape, the combination of a freely rotatable ring upon which the beads are wound, said ring having a smooth cylindrical surface of the same width as the wire tape, a power driven pressure roller in opposition to the periphery of the ring, said roller having a grooved outer periphery to guide and center the wire tape as it is wound, a movable supporting frame carrying said roller, means associated with said frame to normally hold the roller out of driving engagement with the ring, and a foot treadle connected to said frame and operable at will to bring the pressure roller into driving engagement with the ring to effect the winding operation.

5. In a machine for building tire beads from rubberized wire tape, the combination of a freely rotatable ring upon which the beads are wound, said ring having a smooth cylindrical surface of the same width as the wire tape, a power driven pressure roller in opposition to the periphery of the ring, said roller having a grooved outer periphery to guide and center the wire tape as it is wound, a pivoted supporting frame carrying the roller to permit movement of the roller toward and from the ring, a spring connected to said pivoted frame and tending constantly to hold the roller out of driving engagement with the ring, and a foot treadle also connected to the frame and operable at will to bring the roller into driving relation with the ring to effect winding of the wire tape thereon.

6. In a machine for building tire beads from rubberized wire tape, the combination of a freely rotatable ring having a cylindrical surface of the same width as the wire tape and upon which the wire tape is wound, a power driven pressure roller rotatable in opposition to the periphery of the ring to engage the tape as it is wound, said roller being grooved to guide and center the tape on the ring, an adjustable axis-shifting support for the ring, and means for locking said support in different positions with reference to the axis of the pressure roller to accommodate rings of different diameters.

7. In a machine for building tire beads from rubberized wire tape, the combination of a freely rotatable ring having a cylindrical outer periphery of the same width as the wire tape and upon which the tape is wound, said ring being formed at one point in its periphery with a transverse slot to receive the leading end of the wire tape and anchor it to the ring, a grooved pressure roller rotatable against the periphery of the ring and adapted to guide and center the wire tape as it is wound, and means for driving the pressure roller and thru it the ring to effect the winding operation.

8. In a machine for building tire beads from rubberized wire tape, the combination of a rotatable ring, a pressure roller arranged to cooperate with the ring in winding the wire tape spirally thereon without tension, and a cutter arranged to sever the tape near the finish of the winding operation whereby to provide sections of suitable length to form the beads.

9. In a machine for building tire beads from rubberized wire tape, the combination of a rotatable ring, a pressure roller arranged to cooperate with the ring in winding the wire tape spirally thereon from a supply roll, means for driving one and through it the other of said elements in carrying out the bead-winding operation, and a cutter operated in timed relation to the bead-winding operation to sever the wire tape into sections of suitable length to form the beads, said cutter being spaced from the pressure roller at a distance considerably less than the length of tape section necessary to form the bead.

10. In a machine for building tire beads from rubberized wire tape, the combination of a rotatable ring, a pressure roller rotatable in opposition to the periphery of the ring to wind the wire tape spirally thereon without tension, means for driving one and through it the other of said elements in carrying out the bead-winding operation, and means for severing the wire tape into sections of suitable length to form the beads, the said means comprising an impact cutting tool and an anvil between which the wire tape passes as it is wound upon the ring, a power hammer arranged to strike the cutting tool to cause it to sever the wire tape, and a trip device holding the power hammer normally out of action, said wire severing means being spaced from the roller a distance considerably less than the circumference of the winding ring.

11. In a machine for building tire beads from rubberized wire tape, the combination of a rotatable ring, a pressure roller rotatable in opposition to the periphery of the ring to wind the wire tape spirally thereon without tension, means for driving one and through it the other of said elements in carrying out the bead-winding operation, means for severing the wire tape into sections of suitable length to form the beads, the said means comprising an impact cutting tool and an anvil between which the wire tape passes as it is wound upon the ring, a power hammer arranged to strike the cutting tool to cause it to sever the wire tape, a trip device holding the power hammer normally out of action, and means actuated at a predetermined point near the finish of the bead-winding operation to release the power hammer, said wire severing means being spaced from the roller a distance considerably less than the circumference of the winding ring.

12. In a machine for building tire beads from rubberized wire tape, the combination of a rotatable ring, a pressure roller rotatable in opposition to the periphery of the ring to wind the wire tape spirally thereon from a supply roll and without tension, means for driving one and through it the other of said elements in carrying out the bead-winding operation, means for severing the wire tape into sections of suitable length to form the beads, the said means comprising an impact cutting tool and an anvil between which the wire tape passes as it is wound upon the ring, a power hammer arranged to strike the cutting tool to cause it to sever the wire tape, and a trip device holding the power hammer normally out of action, and means settable by the operator and actuated at a predetermined point in the bead-winding operation to release the power hammer, said wire severing means being spaced from the roller a distance considerably less than the circumference of the winding ring.

13. In a machine for building tire beads from rubberized wire tape, the combination of a rotatable ring, a pressure roller rotatable in opposition to the periphery of the ring to wind the wire tape spirally thereon from a supply roll and without tension, means for driving one and through it the other of said elements in carrying out the bead-winding operation, means for severing the wire tape into sections of suitable length to form the beads, the said means being spaced from the pressure point of the roller a distance considerably less than the circumference of the ring comprising an impact cutting tool and an anvil between which the wire tape passes as it is wound upon the ring, a power hammer arranged to strike the cutting tool to cause it to sever the wire tape, and a trip device holding the power hammer normally out of action, means actuated at a predetermined point near the finish of the bead-winding operation to release the power hammer, and means for subsequently restoring the power hammer to its inactive position and bringing it under the control of the trip device.

14. In a machine for building tire beads from rubberized wire tape, the combination of a rotatable ring, a pressure roller rotatable in opposition to the periphery of the ring to wind the wire tape spirally thereon from a supply roll and without tension, means for driving one and through it the other of said elements in carrying out the bead-winding operation, means for severing the wire tape into sections of suitable length to form the beads, the said means being spaced from the pressure point of the roller a distance considerably less than the circumference of the ring, comprising an impact cutting tool and an anvil between which the wire tape passes as it is wound upon the ring, a power hammer arranged to strike the cutting tool to cause it to sever the wire tape, a trip device holding the power hammer normally out of action, means actuated at a predetermined point near the end of the bead-winding operation to release the power hammer, and a foot treadle connected to the power hammer and operable to restore it to inactive position under control of the trip device.

15. In a machine for building tire beads from rubberized wire tape, the combination of a rotatable ring, a pressure roller rotatable in opposition to the periphery of the ring to wind the wire tape spirally thereon, means for driving one and through it the other of said elements in carrying out the bead-winding operation, means for severing the wire tape into sections of suitable length to form the beads, the said means being spaced from the pressure point of the roller a distance considerably less than the circumference of the ring, comprising an impact cutting tool and an anvil between which the wire tape passes as it is wound upon the ring, a vertically acting spring-actuated hammer arranged to strike the cutting tool and cause it to sever the tape, a trip lever normally engaged with the hammer for holding it in raised position, a manually-operated interponent carried by the trip lever, and an actuating member carried by the rotatable ring and adapted to act through the interponent in disengaging the trip lever from the spring-actuated hammer.

16. In a machine for building tire beads from rubberized wire tape, the combination of a rotatable ring, a pressure roller rotatable in opposition to the periphery of the ring to wind the wire tape spirally thereon, means for driving one and through it the other of said elements in carrying out the bead-winding operation, means for severing the wire tape into sections of suitable length to form the beads, the said means being spaced from the pressure point of the roller a distance considerably less than the circumference of the ring, comprising an impact cutting tool and an anvil between which the wire tape passes as it is wound upon the ring, a vertically acting spring-actuated hammer arranged to strike the cutting tool and cause it to sever the tape, a trip lever normally engaged with the hammer for holding it in raised position, a manually-operated interponent carried by the trip lever, an actuating member carried by the rotatable ring and adapted to act through the interponent in disengaging the trip lever from the spring-actuated hammer, and a foot treadle connected to the hammer for restoring it to its raised position for reengagement with the trip lever.

17. In a machine for building tire beads from rubberized wire tape, the combination of a rotatable ring, a pressure roller rotatable in opposition to the periphery of the ring in winding the wire tape spirally thereon, means for driving one and through it the other of said elements in carrying out the bead-winding operation, said ring being formed at one point in its outer periphery with a slot to receive the leading end of the wire tape and anchor it to the ring.

18. In a machine for building tire beads from rubberized wire tape, the combination of a freely rotatably ring formed with a slot in its periphery to receive the leading end of the wire tape, a continuously driven grooved pressure roller rotatable in opposition to the periphery of the ring in winding the tape spirally thereon, a movable supporting frame carrying said roller, a spring connected to the supporting frame for holding the pressure roller normally out of engagement with the ring, and means (such as a foot treadle) also connected to the supporting frame and operable to hold the pressure roller yieldingly in driving engagement with the ring.

19. In a tire-bead building machine, the combination of a freely rotatable ring upon which the beads are formed, a power driven pressure roller rotatable in opposition to the periphery of the ring in forming the beads, and an adjustable axis-shifting support for the ring, whereby the axis of rotation may be located at different distances from the pressure roller to accommodate rings of different diameters.

In testimony whereof, we have affixed our signatures hereto.

FRED BROWN PFEIFFER.
JOHN WILLIAM WHITE.